United States Patent [19]

Buta et al.

[11] Patent Number: 5,433,573
[45] Date of Patent: Jul. 18, 1995

[54] APPARATUS FOR INJECTING FUEL INTO KILNS AND THE LIKE

[76] Inventors: John R. Buta, 663 S. Lincoln Ave.; John C. Buta, 1336-B Pembrooke Dr., both of Salem, Ohio 44460

[21] Appl. No.: 208,218

[22] Filed: Mar. 10, 1994

[51] Int. Cl.6 .............................................. B65G 31/04
[52] U.S. Cl. ..................................... 414/208; 414/152; 414/160; 414/299; 198/624
[58] Field of Search ................ 414/150, 152, 159–160, 414/167, 171–173, 174, 193, 195, 199, 208, 299, 300–301; 198/622, 624, 642

[56] References Cited

U.S. PATENT DOCUMENTS

| | | | |
|---|---|---|---|
| 588,866 | 8/1897 | Kenevel | 414/160 X |
| 906,785 | 12/1908 | Eitle | 414/195 |
| 1,106,444 | 8/1914 | Edison | 110/101 R |
| 2,868,351 | 1/1959 | Hegmann | 414/195 X |
| 3,499,557 | 3/1970 | Walzel | 414/167 X |
| 3,610,391 | 10/1971 | Beck | 198/624 X |
| 4,023,784 | 5/1977 | Wallace | 414/195 X |
| 4,264,351 | 4/1981 | Pieper | 414/199 X |
| 4,551,051 | 11/1985 | Hofbauer et al. | 414/21 |
| 4,640,409 | 2/1987 | Holtman | 198/624 |
| 4,765,273 | 8/1988 | Anderle | 198/624 X |
| 4,806,056 | 2/1989 | Rouse et al. | 414/160 |
| 4,984,983 | 1/1991 | Enkegaard | 432/14 |
| 5,020,579 | 6/1991 | Strong | 198/624 X |
| 5,078,594 | 1/1992 | Tutt et al. | 432/103 |
| 5,083,516 | 1/1992 | Benoit et al. | 110/344 |
| 5,167,772 | 12/1992 | Parker, Sr. | 414/173 X |
| 5,184,714 | 2/1993 | Tapp | 414/300 X |
| 5,299,900 | 4/1994 | Mailliet et al. | 414/208 X |

FOREIGN PATENT DOCUMENTS

| | | | |
|---|---|---|---|
| 0009315 | 7/1907 | France | 414/174 |
| 0661905 | 6/1938 | Germany | 414/160 |
| 0102817 | 8/1980 | Japan . | |
| 0078730 | 6/1981 | Japan | 414/160 |
| 0253905 | 2/1927 | United Kingdom . | |

Primary Examiner—David M. Mitchell
Assistant Examiner—James W. Keenan

[57] ABSTRACT

An apparatus is provided for injecting fuel in the form of pieces of various sizes into a burning zone of a kiln having an end inlet. The apparatus includes two rubber tires rotating in opposite directions, at least one motor for rotating the tires, an entrance chute, and an exit chute. The tires rotate about horizontal and parallel axes that are in an inclined plane and spaced such that the outer radial surfaces of the tires are generally adjacent. The entrance chute has a vertical inlet portion for receiving the fuel pieces and downwardly accelerating the fuel pieces by gravity and an outlet portion open adjacent the tires for feeding the fuel pieces between the tires. The tires elastically deform around the various size fuel pieces and project them as the tires rotate. The exit chute has an axis perpendicular to the inclined plane of the tire axes for directing the projected fuel pieces through the kiln end inlet. The apparatus also includes mechanisms for making adjustments to: the inclination of projection; the windage of projection; and the spacing between the tires.

22 Claims, 8 Drawing Sheets

APPARATUS FOR INJECTING FUEL INTO KILNS AND THE LIKE

BACKGROUND OF THE INVENTION

1. Field of the Invention

The present invention generally relates to the delivery of secondary fuel for combustion in kilns and the like, and more specifically to an apparatus for projecting fuel through an end inlet of the kiln comprising oppositely rotating rollers.

2. Description of the Related Art

It is desirable in many applications to supplement or replace conventional oil, gas, or coal fuels to obtain savings in the total fuel costs of operation or reduce emissions of the combustion process. It is well known to use scrap or worn rubber pneumatic tires from motor vehicles as secondary or alternative fuel in a furnace or kiln. The scrap tires provide a relatively inexpensive source of fuel that has typically in the past been discarded in land fills. For example, cement kilns can effectively be fired using scrap tires as a significant portion of the total fuel without the ash diminishing the quality of the cement. It will be noted that other furnaces or kilns, such as lime kilns, and other fuels, such as wood chips, can produce similar results.

Various attempts have been made in the art to provide an apparatus to supply tires as a secondary fuel. For example, U.S. Pat. No. 4,551,051 discloses a lock chamber structure attached to an end wall of a kiln having a runway and two gates. The runway is downwardly inclined toward the kiln. The first or receiving gate is provided with a tire holder for holding a whole tire in a rolling position in which it is aligned with the runway. When the tire is loaded into the tire holder, the receiving gate is closed and the second or kiln gate is opened. Once the kiln gate is opened, the tire is released by the tire holder and accelerates down the runway and continues to roll into the kiln. An apparatus of this type may not deliver the tire an adequate distance into the kiln. The tire must be delivered a distance to provide ample time to burn and complete all necessary chemical reactions. This is especially true for reinforcing fiber or steel wire embedded in the rubber tires to be properly absorbed into the cement mixture.

U.S. Pat. No. 5,078,594 discloses an apparatus for supplying tires through a port in the cylindrical wall of an operating rotating kiln. The apparatus includes a closure assembly for the port, a drop tube, a stationary staging assembly, and a kiln mounted transfer assembly. A tire is loaded on the staging assembly and as the kiln rotates the transfer assembly sweeps past and picks up the tire. As the transfer assembly reaches near vertical position the tire moves under the force of gravity toward the port. The port closure assembly is automatically cammed to an opened-position, and the tire drops through the port and drop tube into the kiln. As the kiln continues to rotate the spring loaded closure assembly automatically returns to a closed-position. An apparatus of this type requires a port hole in the cylindrical wall of the kiln and a closure assembly and thus requires modifications to the kiln or a specially designed kiln. Additionally, the use of whole tires may not give a good distribution of the secondary fuel into the cement mixture.

It is also known in the art to chop or shred tires for fuel which is commonly referred to as tire-derived fuel (TDF). TDF typically is composed of variously-sized pieces including coarse pieces and various amounts of reinforcing fiber and steel wire. Various attempts have been made in the prior art to supply TDF to a kiln or furnace. For example, U.S. Pat. No. 4,806,056 discloses an apparatus for delivering TDF to a combustion chamber of a kiln through an end wall. The apparatus includes a hopper having a variable speed screw conveyor, an electric blower, a nozzle assembly, and a delivery conduit. The screw conveyor delivers a metered amount of tire pieces from the hopper in response to the required firing rate of the kiln. An exhaust pipe from the blower is connected to a nozzle. A shroud encloses the nozzle and includes an inlet through which the tire pieces are introduced. The tire pieces are entrained by the flow of air carrying them into the delivery conduit for delivery to the kiln. An apparatus of this type may introduce an excessive amount of air into the kiln and thereby create a cooling effect in the kiln. Additionally, the apparatus may not deliver the tire an adequate distance into the kiln to provide the time required for completion of all the necessary chemical reactions. Moreover, the coarse pieces of fuel may easily jam or clog the apparatus requiring it to be shut down and cleared of the clogged fuel pieces.

See also U.S. Pat. No. 4,984,983 an apparatus for ballistically introducing whole drums or smaller containers from an end of the kiln and an apparatus for pneumatically injecting a granular product from an end of the kiln.

U.K. Patent No. 253,905 discloses an apparatus for feeding pulverized fuel into a combustion chamber of a boiler furnace. The apparatus comprises two drums rotating in opposite directions, a hopper, and a feeding mechanism. Pulverized coal from the discharge hopper is fed by the feeding mechanism between the drums. The drums deliver a thin sheet of the fuel through a nozzle in a horizontal direction and into the updraft of the combustion chamber. An apparatus of this type may require the fuel to be pulverized and would jam or clog upon the introduction of coarse pieces of fuel. Additionally, the apparatus may require a feeding mechanism in the input hopper to prevent clogging or jamming of the pulverized fuel.

Each of the aforementioned patents are herein incorporated in there entirety by reference.

There is a need, therefore, in the art for an improved apparatus for injecting secondary fuel of various size pieces into the combustion zone of a kiln in a controlled and uniform manner. Moreover, there is a need in the art for an apparatus for injecting secondary fuel a distance which provides the fuel with ample time to burn and without the inlet of excessive amounts of air.

SUMMARY OF THE INVENTION

The present invention provides an apparatus for injecting secondary or alternative fuel of various size pieces, such as chopped rubber tires including course pieces, and containing various amounts of reinforcing fiber and steel wire, into a combustion zone of a kiln or furnace. The disadvantages of the prior art are overcome by providing oppositely rotating rollers.

According to the invention, the apparatus includes two rollers rotating in opposite directions, at least one motor for rotating the rollers, an entrance chute, and an exit chute. The rollers rotate about generally parallel axes spaced such that outer radial surfaces of the rollers are generally adjacent. The entrance chute receives the fuel pieces from a conveyor and directs the fuel pieces between the rollers. In a preferred embodiment, the entrance chute has a vertical inlet portion for downwardly accelerating the fuel pieces by gravity and an outlet portion open adjacent the rollers for feeding the fuel pieces between the rollers. The rollers elastically deform around the various size fuel pieces and project them as the rollers rotate. The exit chute directs the projected fuel pieces into the kiln or furnace.

It is a principle feature of the present invention to provide an apparatus that can deliver secondary or alternative fuel to a kiln or furnace in a simple and economic manner. It is another aspect of the present invention to provide an apparatus capable of operating in a variety of kiln or furnace sizes and designs.

It is an important feature of the present invention that it provides resilient rollers which are capable of elastically deforming around various sizes of fuel pieces including coarse pieces. It is another important feature of the present invention that it provides oppositely rotating rollers that project the fuel pieces distances of up to and over 200 feet which provide ample time for the fuel to burn. It is a further important feature of the present invention that it provides rotating rollers which inject fuel pieces without the inlet of excessive amounts of air which may have a cooling effect. It is yet a further feature of the present invention that it provides rotating rollers to inject fuel pieces uniformly and in controlled variable quantities to provide uniform and controlled firing rates. It is also a further feature of the present invention that it provides an entrance chute which has an inlet portion which accelerates the fuel pieces to avoid jamming due to friction and an outlet portion open adjacent the rollers for allowing the rollers to grab the fuel pieces and feed them between the rollers and therefore eliminating the need for a feed mechanism.

The foregoing and other features, and advantages of the present invention will be more readily understood upon consideration of the following detailed description of the invention in conjunction with the accompanying drawings.

BRIEF DESCRIPTION OF THE DRAWINGS

A preferred embodiment of the present invention will hereafter be described in detail with reference to the drawing figures, wherein.

DETAILED DESCRIPTION OF THE PREFERRED EMBODIMENT

Figure 3:
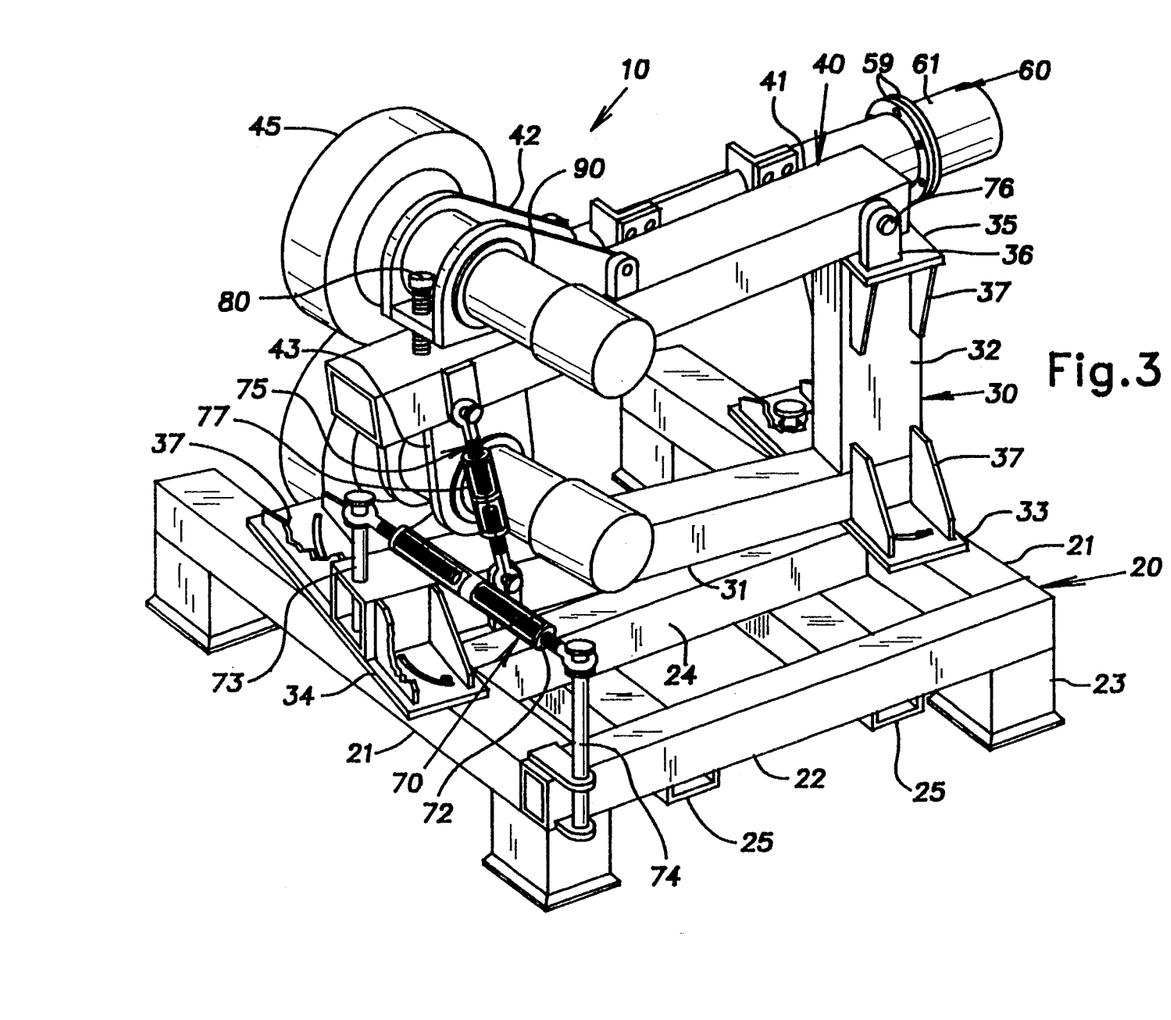
FIG. 3 is a perspective view of a fuel projector with an entrance chute removed for clarity.
Figure 4:
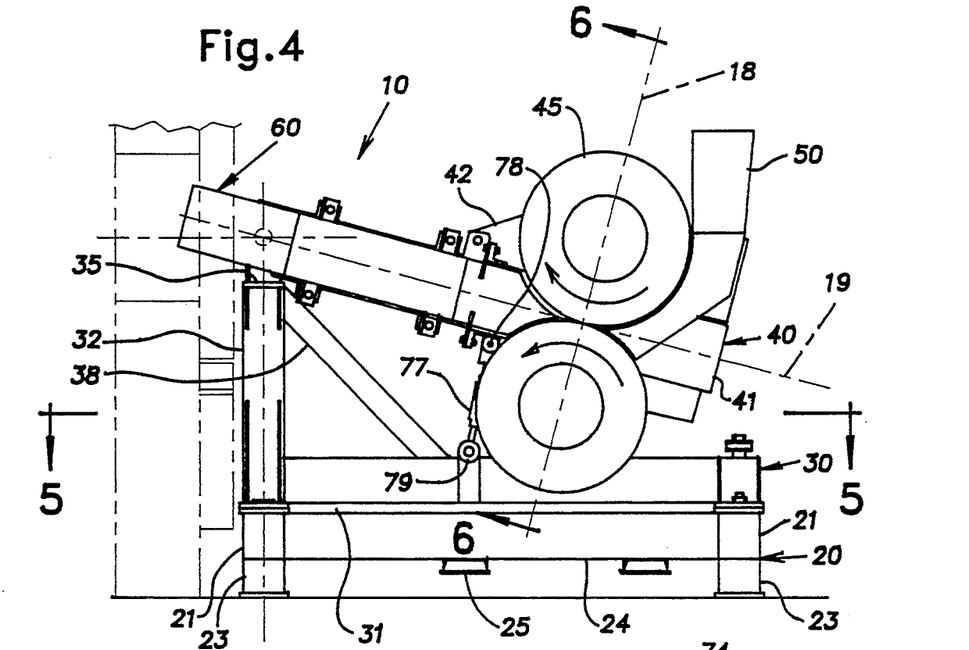
FIG. 4 is a side elevational view of a fuel projector with the entrance chute shown.

As best seen in FIGS. 3 and 4, an exemplary apparatus for injecting fuel into a kiln, or a fuel projector 10, includes a base frame 20, a pivoting base 30, a support bar 40, two motors assemblies 90, two rollers 45, an entrance chute 50, and an exit chute 60. The fuel projector 10 also includes a mechanism 70 for adjusting windage of projection, a mechanism 75 for adjusting inclination of projection, and a mechanism 80 for adjusting spacing between the rollers 45.

Figure 5:
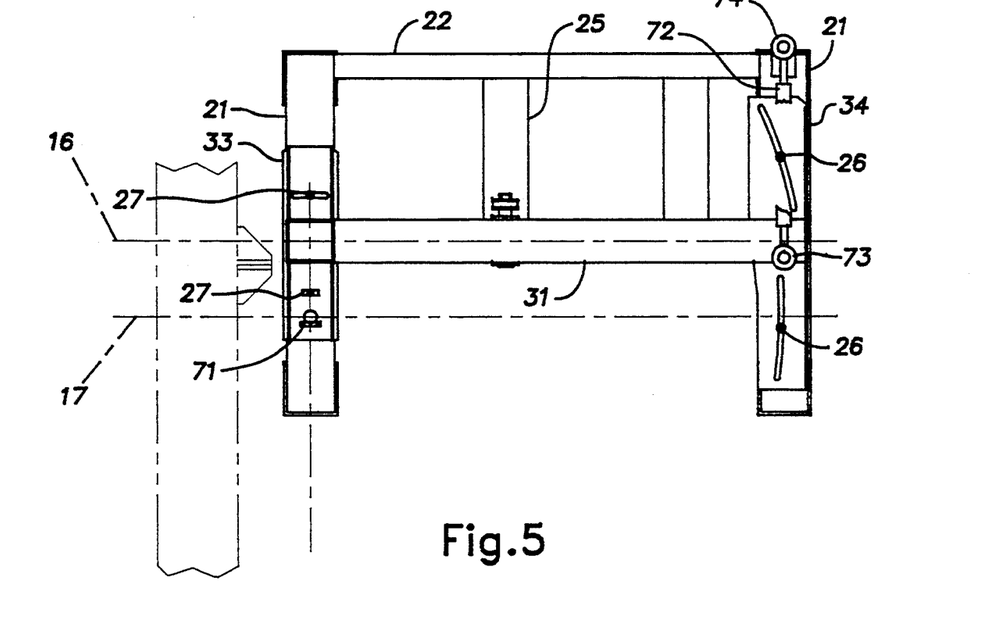
FIG. 5 is a cross-sectional view taken along line 5—5 of FIG. 4.

As best seen in FIGS. 3–5, the base frame 20 is generally "C"-shaped and includes a pair of transverse tubes 21, a longitudinal tube 22, and four supports 23. The longitudinal tube 22, the transverse tubes 21, and the supports 23 are generally square or rectangularly-shaped steel tubes. The "C"-shaped base frame 20 is formed by connecting the parallel, spaced apart, transverse tubes 21 at one end with the longitudinal tube 22. Downwardly extending and fixed to each end of the transverse tubes 21 are the supports 23. The supports 23 thus space and support the transverse and longitudinal tubes 21, 22 above the floor. An additional longitudinal tube 24 is provided to not only increase the stiffness of the base frame 20, but also to provide support along with the longitudinal tube for fork lift transportation slots 25 as best seen in FIGS. 3 and 4.

As best seen in FIGS. 3–5, the pivoting base 30 is generally "L"-shaped and includes a horizontal tube 31 and a vertical tube 32. The horizontal and vertical tubes 31, 32 are of material and cross section similar to the base frame transverse tubes 21. The horizontal tube 31 has a length generally equal to the longitudinal length of the base frame 20. The "L"-shaped pivoting base 30 is formed by connecting the vertical tube 32 such that it extends upwardly from a forward end of the horizontal tube 31. Also fixed to the forward end of the horizontal tube 31 opposed to the vertical tube 32, a bottom side of the horizontal tube 31, is a front support plate 33. The front support plate 33 is a steel plate that has a width slightly larger than a width of the vertical tube 32 and a length that extends transversely beyond the horizontal tube 31 in each direction. A rear support plate 34, similar to the front support plate 33, is fixed to a rear end of the horizontal tube 31.

Fixed to a top end of the vertical tube 32, opposed to the horizontal tube 31, is a pivot plate 35. The pivot plate 35 is a steel plate that has a width generally equal to the width of the vertical tube 32 and a length that extends transversely beyond the vertical tube 32 in each direction. Upwardly extending from the pivot plate 35 are two spaced apart pivot arms 36. Fixed between the front support plate 33, rear support plate 34, and pivot plate 35, and respective horizontal tube 31 and vertical tube 32 are generally triangularly-shaped stiffening webs 37. Preferably a diagonal support 38 is fixed between the horizontal and vertical tubes 31, 32 of the "L"-shaped pivoting base 30 to increase the stiffness of the pivoting base 30, as seen in FIG. 4.

As best seen in FIGS. 3 and 5, the pivoting base 30 is supported by the base frame 20. Two bolts 27 in the front support plate 33 and two bolts 26 in the rear support plate 34 attach the pivoting base 30 to the transverse tubes 21 of the base frame 20. A vertical plane 16 containing the axes of the horizontal and vertical tubes 31, 32 of the pivoting base 30 is nominally positioned at the center of the transverse tubes 21 of the base frame 20.

The mechanism 70 for adjusting windage of projection includes a pivot pin 71, a turnbuckle 72, and two retaining rods 73, 74. The pivot pin 71 is fixed to the transverse tube 21 at the front side of the base frame 20. The axis of the pivot pin 71 is contained in a vertical plane 17 of projection which is parallel to and spaced approximately 13 inches from the vertical plane 16 of the pivoting base 30. The pivot pin 71 extends upwardly through an opening in the front support plate 33 such that the pivoting base 30 is rotatable or pivotable about the pivot pin 71. Each of the openings in the front and back support plates 33, 34 for the respective bolts 26, 27 attaching the pivoting base 30 to the base frame 20 are arcuately slotted having a radius about the axis of the pivot pin 71. The turnbuckle 72 of the preferred embodiment is a McMaster-Carr forged turnbuckle #2999T69 having an eye at each end. The turnbuckle 72 extends substantially horizontally and transversely between the upwardly extending retaining rods 73, 74. The first retaining rod 73 is fixed to the rear end of the horizontal tube 31 of the pivoting base 30, and the second retaining rod 74 is fixed to the rear end of the longitudinal tube 22 of the base frame 20. The retaining rods 73, 74 fix the position of each eye of the turnbuckle 72 relative to the structure to which it is attached while allowing each eye to be rotatable about the retaining rods 73, 74.

As best seen in FIGS. 3 and 4 the support bar 40 includes an inclined tube 41, an upper motor support 42, and a lower motor support 43. The inclined tube 41 is of material and cross section similar to the base frame transverse tubes 21 and has a length slightly shorter than the longitudinal length of the base frame 20. The lower motor support 43 is fixed to and downwardly extends from the bottom of a rear portion of the inclined tube 41. The upper motor support 42 is attached to the top of the rear portion of the inclined tube 41 so that a plane 18 containing the axis of rotation of each motor assembly 90 is generally perpendicular to the axis of the inclined tube 41. The upper and lower motor supports 42, 43 should space the axes of the motor assemblies 90 a distance that makes an outer radial periphery of the rollers 45 adjacent one another. Adjacent is defined to include touching or spaced apart, and also includes the possibility that a separate element may be between the two rollers 45.

Figures 8, 9:
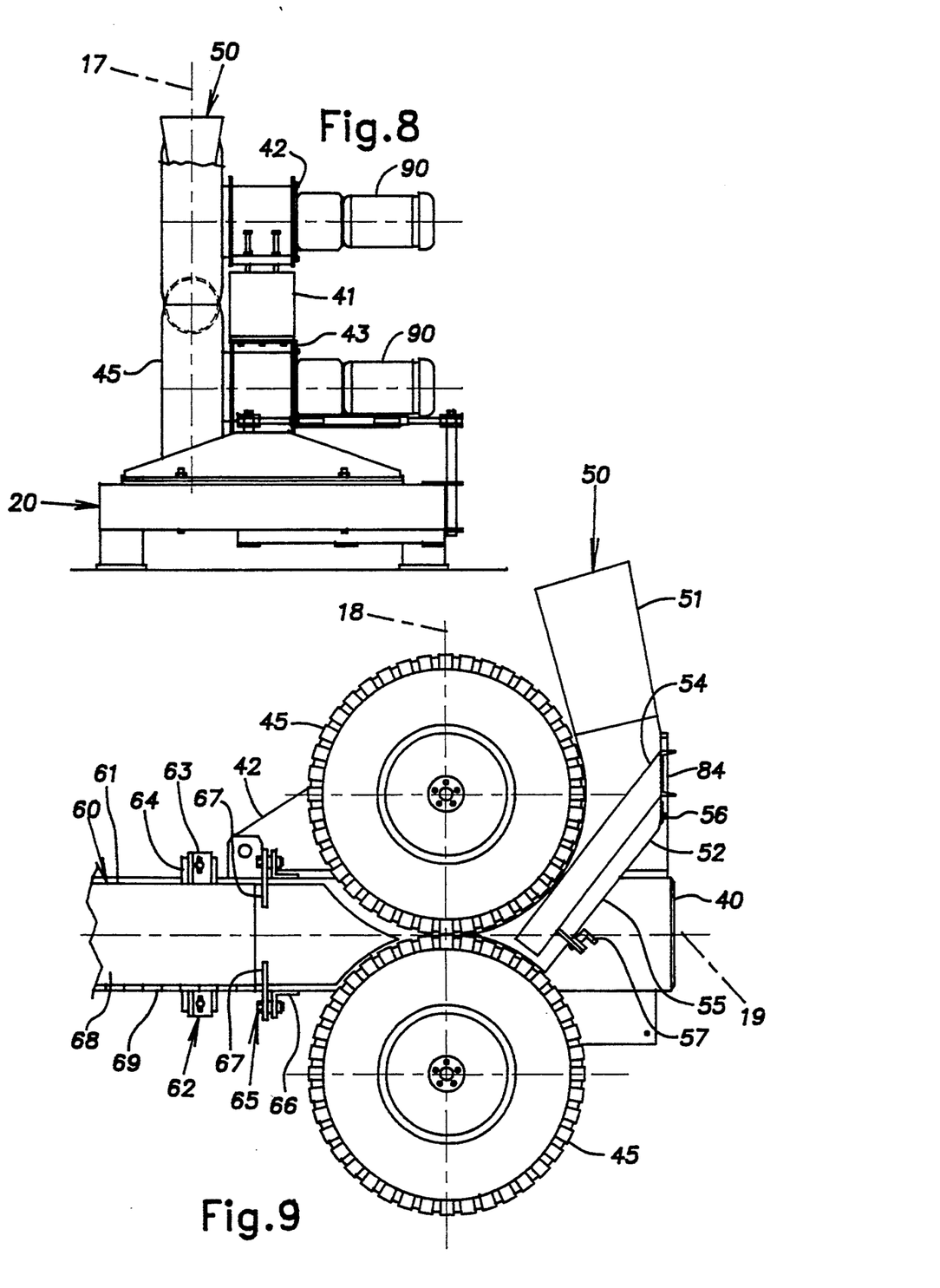
FIG. 8 is a rear elevational view of the fuel projector of FIG. 4 with the entrance chute partially removed for clarity.
FIG. 9 is an enlarged view of the fuel projector of FIG. 4 in the area of the rollers.
Figure 11:
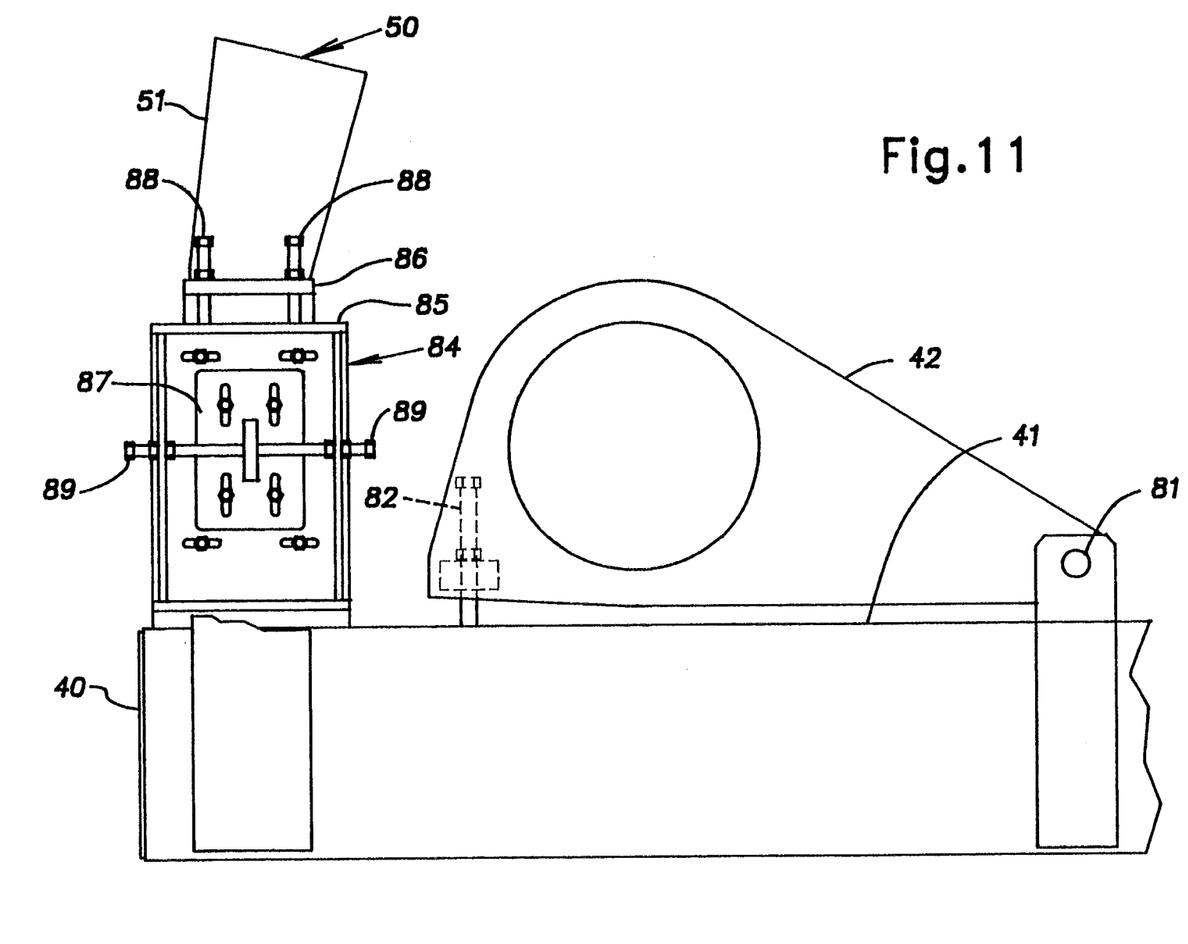
FIG. 11 is an enlarged side elevational view of the fuel projector of FIG. 4 in the area of the entrance chute mounting bracket with the rollers and motor removed for clarity.

As best seen in FIGS. 3, 8, and 11, the mechanism 80 for adjusting spacing between the rollers 45 includes a pivot pin 81, and two adjustment screws 82. The upper motor support 42 is rotatably or pivotably attached to the inclined tube 41. The pivot pin 81 is fixed to the inclined tube 41 and extends through an opening in the forward end of the upper motor support 42 so that the upper motor support 42 is rotatable or pivotable about the pivot pin 81. The adjustment screws 82 are threaded within and downwardly extend through a rear end of the upper motor support 42. The ends of the adjustment screws 82 rest against the inclined tube 41 under the force of gravity.

Figure 7:
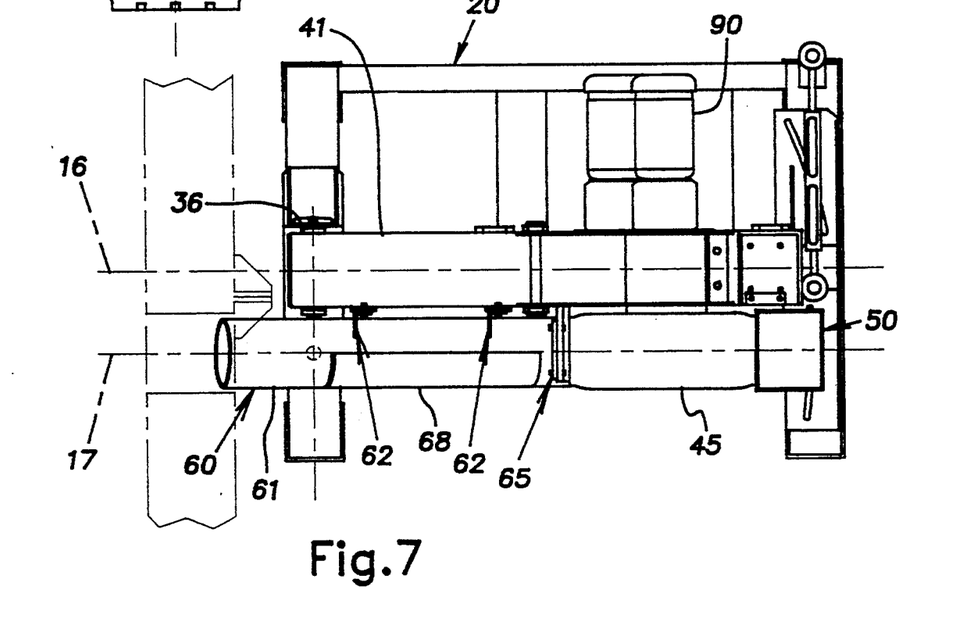
FIG. 7 is a plan view of the fuel projector of FIG. 4.

As best seen in FIGS. 3, 4 and 7, the forward end of the inclined tube 41 of the support bar 40 extends between the pivot arms 36 of the pivoting base 30. A pivot pin 76 horizontally extends between and is fixed to the pivot arms 36. The pivot pin 76 extends through an opening in the inclined tube 41 so that the support bar is pivotable or rotatable in the vertical plane 16 of the pivoting base 30. The mechanism 75 for adjusting inclination of projection is attached to and supports the support bar 40 so that it inclines upwardly from the rear end to the forward end of the support bar 40. The axis of the support bar 40 is contained in an inclined plane 19 of projection. In the preferred embodiment, the inclined plane 19 of projection is nominally inclined 15 degrees from horizontal.

The mechanism 75 for adjusting inclination of projection includes a turnbuckle 77, and two retaining pins 78, 79. The turnbuckle 77 of the preferred embodiment is a McMaster-Carr forged turnbuckle #2998T67 having a clevis at one end and an eye at the other end. The clevis of the turnbuckle 77 extends about the retaining pin 78 fixed to the inclined tube 41 of the support bar 40 and the eye of the turnbuckle 77 extends about the retaining pin 79 fixed to the horizontal tube 31 of the pivoting base 30. The turnbuckle 77 is mounted such that it extends generally perpendicular to the support bar 40 in its nominal inclination. The retaining pins 78, 79 fix the position of each end of the turnbuckle 77 relative to the structure to which it is attached while allowing the ends to be rotatable about the retaining pins 78, 79. In the preferred embodiment, the plane 19 of projection can be adjusted at least in the range of 10 to 15 degrees from horizontal.

Figure 6:
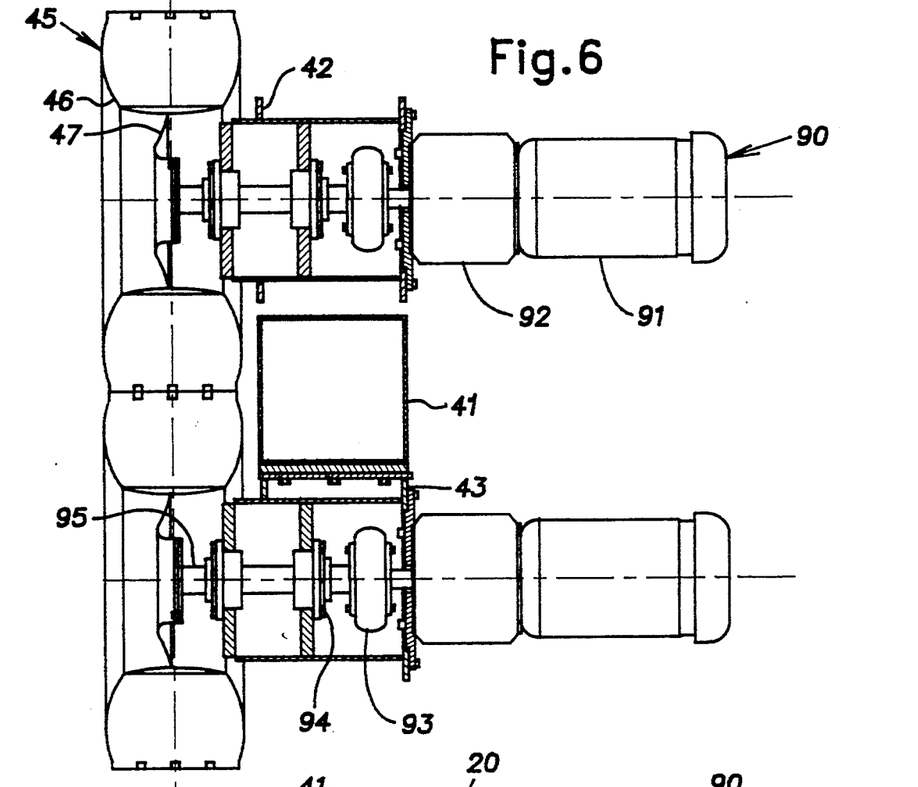
FIG. 6 is a cross-sectional view taken along line 6—6 of FIG. 4.

As best seen in FIG. 6, the motor assemblies 90 include an A.C. motor 91, a brake assembly 92, a flexible coupling 93, a bearing assembly 94, and a shaft 95. The motor assemblies 90 are identical except for the direction of rotation, therefore only the motor assembly 90 attached to the upper motor support 42 will be described in detail. The A.C. motor 91 is attached to the brake assembly 92. Preferably the A.C. motor 91 is a variable speed motor capable of operating in a range of about 500 to 1000 R.P.M. The A.C. motor 91 of the preferred embodiment is a G.E. premium efficiency A.C. motor, 3 H.P., 1200 R.P.M. 460 VOLT/3 PH, 213TC cast iron C-face frame, item #E9950. The brake assembly 92 is mounted to the upper motor support 42. The brake assembly 92 of the preferred embodiment is a Stearns spring set disk brake, series 87,700, 25 LB./FT., 115 VOLT A.C., 213TC C-face mounting, dust tight and water proof frame, item #1-087-732-03. The shaft 95 is rotatably mounted in the bearing assembly 94, which is mounted to the upper motor support 42, so that the rotational axis of the shaft is substantially concentric with the rotational axis of the A.C. motor 91. The bearing assembly 94 of the preferred embodiment is a Dodge S-2000 piloted flange spherical roller bearing, 115/16 IN. bore, item #044776. The shaft 95 is coupled to the shaft of the A.C. motor 91 and brake assembly 92 by the flexible coupling 93. The flexible coupling 93 compensates for any misalignment. The flexible coupling 93 of the preferred embodiment is a Dodge Para-flex coupling #PX80 with taper lock bushings with a first side having 1⅜ IN. bore with a 5/16 IN.×5/32 IN. K.W., and a second side having 115/16 IN. bore with a ½ IN.×¼ IN. K.W.

As best seen in FIG. 6, the rollers 45, which may be resilient or rigid, are mounted to the shaft 95 opposite the A.C. motors 91 so that the centerline of the width of the rollers 45 is contained in the vertical plane 17 of projection. The rollers 45 should have the ability to elastically deform at their outer radial surface. Preferably the outer radial surface of the rollers 45 is a gripping surface that easily grabs and projects the fuel. A gripping surface typically has a high coefficient of friction and may include surface irregularities such as indentations, grooves, or protrusions. Also preferably, the rollers are resilient. The rollers 45 of the preferred and illustrated embodiment are pneumatic rubber tires 46 mounted on wheels 47. Pneumatic rubber tires are an economical and widely available alternative for the rollers 45 which, as a high wear component, require replacement. In the preferred embodiment the rollers 45 are light truck tires size 33 IN.×12.50 R 15 LT mounted on a 15 In.×10 In. steel wheel having a five hole bolt pattern on a 5½ IN. bolt circle. The tires are preferably inflated to standard pressures but operate successfully from no pressure to the rated pressure of the tires. It will be observed that other embodiments of the rollers 45 can be utilized. For example, the rollers 45 can be rubber covered steel hubs, or solid rollers having spring or shock absorber mounts.

Assembled in this manner the motor assembly 90 attached to the upper motor support 42 rotates the attached roller 45 in the clockwise direction as viewed in FIG. 4. The motor assembly 90 attached to the lower motor support 43 rotates the attached roller 45 in the counter-clockwise direction as viewed in FIG. 4. Therefore, the roller 45 are rotating in opposite directions and the outer radial surface of both rollers 45 is traveling from right to left, as viewed in FIG. 4, adjacent the inclined plane 19 of projection.

Figure 10:
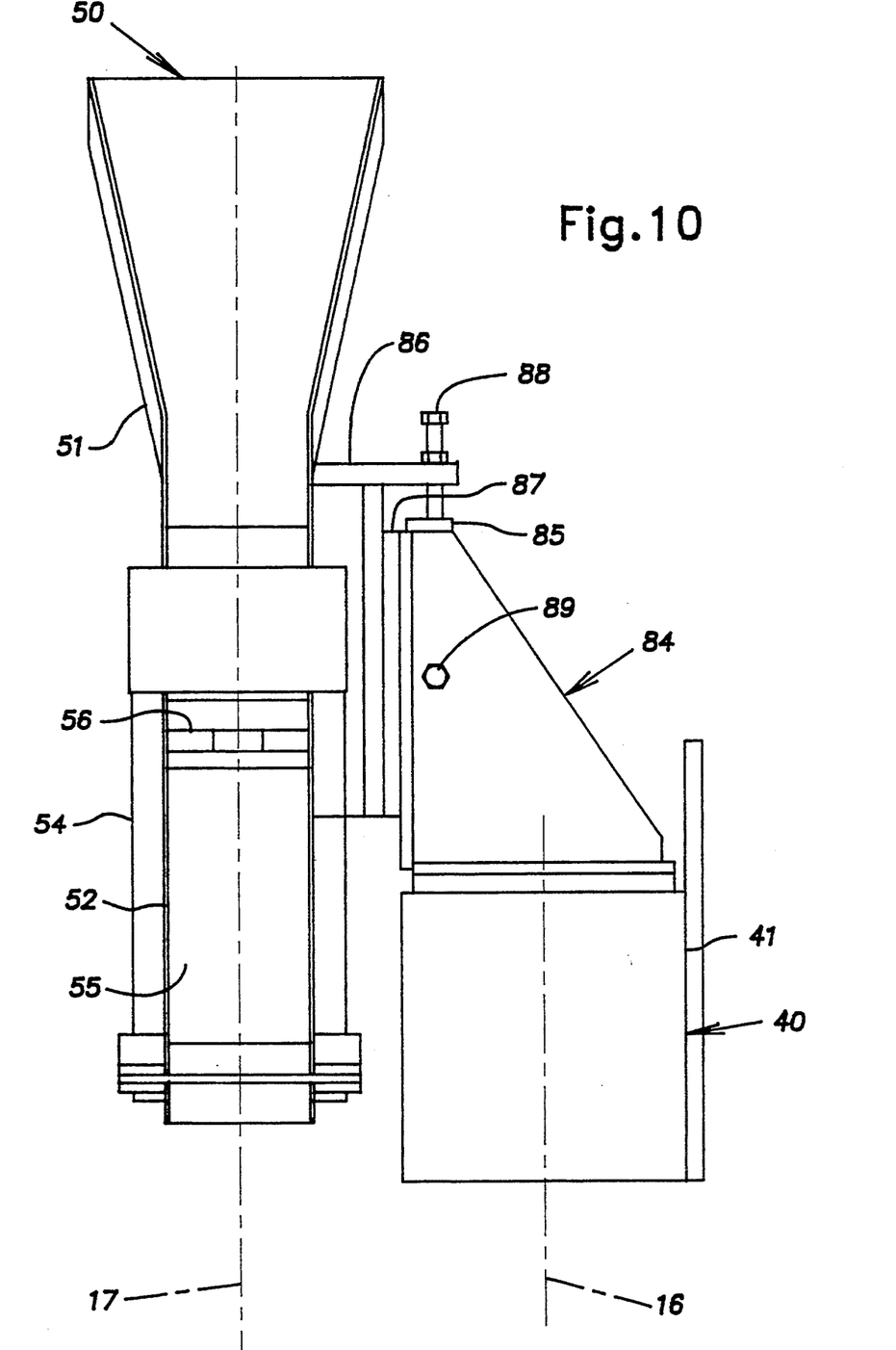
FIG. 10 is an enlarged end elevational view of the fuel projector of FIG. 4 in the area of the entrance chute.

As seen in FIGS. 9 and 10, the entrance chute 50 includes an inlet portion 51 and an outlet portion 52, and is attached to the support bar 40 by a mounting assembly 84. The inlet portion 51 extends upwardly and forwardly at an angle of approximately 15 degrees from vertical so that when the support bar 40 is nominally inclined 15 degrees, the inlet portion 51 extends substantially vertically above a horizontal plane containing the axis of the upper resilient roller 45 (as best seen in FIG. 4). The inlet portion 51 has a rectangular-shaped cross section that is open at both the top and bottom ends. In the longitudinal direction, the bottom end of the inlet portion 51 has a length of approximately 10 IN. that gradually increases on the rear side so that the top end has a length of 10½ IN. In the transverse direction, the bottom end of the inlet portion 51 has a length of approximately 6 IN. and above a plane approximately 5 IN. above the bottom end, gradually increases in both directions so that the top end has a length of 12 IN. The length in the transverse direction at the bottom of the inlet portion and the outlet portion should be less than a width of the rollers 45.

The outlet portion 52 extends downwardly and forwardly from the bottom of the inlet portion 51. The outlet portion 52 has a "U"-shaped cross section with the open side facing the rollers 45. The rear side of the outlet portion 52 extends downwardly from the inlet portion 51, generally parallel to the plane 18 containing the axes of the rollers 45, and then forwardly at an angle generally 50 degrees above the inclined plane 19 of projection to the roller 45 mounted on the lower motor support 43. This angle is important in minimizing the amount of jamming of the fuel pieces. The angle must be such that the fuel pieces 11 (FIG. 1) downwardly slide without hanging-up or jamming on the side of the outlet portion 52. The forward or open side of the outlet portion 52 is contoured to the shape of the rollers 45. Preferably the outlet portion 52 includes a stiffener 54 to increase the stiffness of the outlet portion 52. Additionally, at least a portion of the outlet portion 52 should be movable. In the preferred embodiment, the outlet portion 52 includes a pivoting panel or door 55. The door 55 is located at the bottom rear of the outlet portion 52 and pivots about a hinge 56 located at the upper end of the door 55. The door 55 is held closed by a conventional ball lock pin 57 at the lower end of the door 55.

The entrance chute 50 of the preferred embodiment is made of steel sheet. It will be observed that other materials or coatings having a lower coefficient of friction may result in less jamming or a smoother flow of the fuel pieces to the resilient rollers 45.

As seen in FIGS. 7, 9, 10, and 11, the mounting assembly 84 is attached to the top of the rear portion of the support bar 40. The mounting assembly 84 positions the entrance chute 50 adjacent the rear side of the resilient rollers 45. In the transverse direction, a centerline of the entrance chute 50 is contained in the vertical plane 17 of projection. The mounting assembly 84 is adjustable to position and orient the entrance chute 50 in a plane perpendicular to the axes of rotation of the resilient rollers 45.

The mounting assembly 84 includes a base 85, a bracket 86, an intermediate plate 87, and adjustment screws 88, 89. A lower surface of the base 85 is attached to the inclined tube 41 of the support arm 40 and a side surface of the base 85 is fastened to the intermediate plate 87. The intermediate plate 87 is fastened to the bracket 86 which is fixed to the entrance chute 50. The openings in the base 85 for fastening the intermediate plate 87 to the base 85 are slotted in a direction parallel to the axis of the inclined tube 41. Therefore, the two adjustment screws 89, attached to opposed sides of the base 85, can be manipulated to move the intermediate plate 87, and attached bracket 86 and entrance chute 50, in the direction parallel to the axis of the inclined tube 41 to more precisely position the entrance chute 50. The openings in the intermediate plate for fastening the bracket 86 to the intermediate plate 87 are slotted in a direction perpendicular to the axis of the inclined tube 41. Therefore, the two adjustment screws 89, attached to the top of the bracket 86, can be manipulated to move the bracket 86, and attached entrance chute 50, in the direction perpendicular to the axis of the inclined tube 41 to more precisely position the entrance chute 50. By precisely positioning the entrance chute 50 adjacent the resilient rollers 45 the amount of fuel pieces spilling out of any gap can be minimized.

As seen in FIGS. 4, 7 and 9, the exit chute 60 includes a tube 61, two transverse mounting assemblies 62, and a longitudinal mounting assembly 65. The tube 61 of the preferred embodiment has an inside diameter of 10 IN. and a wall thickness of ⅜ IN. The tube 61 is contoured to the resilient rollers 45 at the rear end and extends forwardly approximately 72¾ IN. from the plane 18 containing the axes of the resilient rollers 45. Preferably, a side section of the exit chute tube 61 opens or is otherwise movable. In the preferred embodiment a door 68 pivots open about a hinge 69 at the bottom of the tube 61. The door 68 extends circumferentially from the bottom of the tube 61 and for one half the diameter of the tube 61 to the top of the tube 61. The door 68 extends forwardly for approximately 35¾ IN. from a point adjacent the longitudinal mounting assembly 65. Preferably the door is located as close as possible to the rear end of the exit chute tube 61. Additionally, at least a portion of the forward end of the exit chute tube 61 is perferably removable so that it can be replaced if damage from heat degradation occurs. As shown in FIG. 3, the illustrated embodiment of the exit chute tube 61 has main portion and a end portion that are connected to form a continuous tube 61. Flanges 59 extend radially outwardly from the two portions of the exit chute tube 61 and are connected by conventional fastening means.

The tube 61 of the exit chute 60 is attached to the support bar 41 such that the axis of the tube 61 is contained in both the vertical plane of projection 17 and the inclined plane 19 of projection. The tube is adjustably attached to the support bar 40 by the longitudinal mounting assembly 65 and the transverse mounting assemblies 62.

The longitudinal mounting assembly 65 includes a bracket 66 and a two plates 67. The bracket 66 is attached to the support bar 40 and extends above and below the exit chute tube 61 adjacent the resilient rollers 45. The plates 67 are fixed above and below the exit chute tube 61 to be adjacent the bracket 66. The plates 67 and bracket 66 are bolted together to attach the exit chute 60 to the support bar 40.

The transverse mounting assemblies 62 are located adjacent the longitudinal mounting assembly 65 and adjacent the pivot arms 36 of the pivoting base 30 and include an angle bracket 63 and a plate 64. The plate 64 is mounted to the support bar 40 and extends above and below the exit chute tube 61. A first leg of the angle bracket 63 is fixed to the exit chute tube 61 such that a second leg is adjacent to and facing the plate 64. The plate 64 and angle bracket 63 are bolted together to attach the exit chute 60 to the support bar 40.

Preferably the bolt openings in the plates 67 of the longitudinal mounting assembly 65 and the angle brackets 63 of the transverse mounting assemblies 62 are slotted in a direction perpendicular to inclined plane 19 of projection. These slotted bolt openings allow adjustment of the exit chute 60 in the direction perpendicular to the inclined plane of projection 19 in order to more precisely position the exit chute relative to the resilient rollers 45. Additionally, the bolt openings in the plates 64 of the transverse mounting assemblies 62 are slotted in a direction parallel to the axis of the exit chute 60. The slotted bolt openings allow adjustment of the exit chute 60 in the direction parallel to the axis of the exit chute 60 by placing various size shims between the plates 67 and bracket 66 of the longitudinal mounting assembly 65 to more precisely position the exit chute 60 relative to the rollers 45. By precisely positioning the exit chute 60 adjacent the rollers 45 the amount of fuel pieces spilling out of any gap can be minimized.

Figure 1:
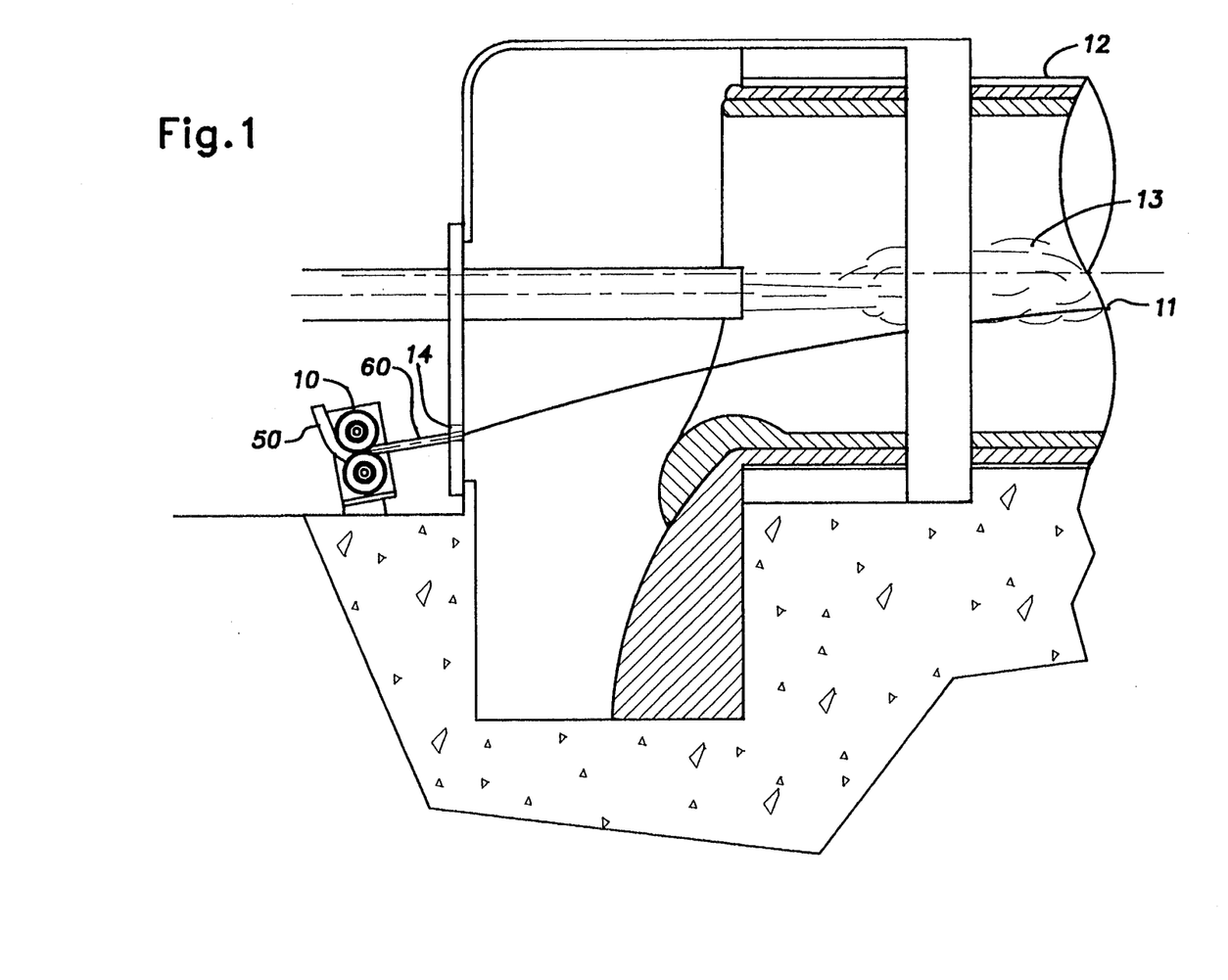
FIG. 1 is an elevational view, in cross-section, of a kiln having a fuel projector.

The fuel projector 10 is shown in FIG. 1 in a cement kiln 12 application. For example, the kiln 12 may have a 22 feet 8 inch diameter and a fuel pipe extending approximately 18 feet into the kiln from an end. The exit chute 60 of the fuel projector 10 is positioned at an inlet 14 at the end of the kiln 12 that is approximately 5 feet 3 inches above the floor. Positioned in this manner the fuel projector 10 can inject the pieces of fuel 11, such as tire derived fuel (TDF), at an inclination of approximately 15 degrees into the kiln 12 past the conventional fuel stream 13.

Preferably the fuel pieces 11 are stored in a bin at a remote location that is convenient for loading. From the bin, the fuel pieces 11 are fed to an automatic weighing conveyor (not shown) which delivers a desired amount of fuel pieces 11 in tons per hour. The fuel projector 10 is capable of injecting a maximum of 7 to 10 tons per hour while the prior art is capable of only 1 to 2 tons. Preferably, the end of the conveyor is positioned approximately 12 feet above the entrance chute 50 of the fuel projector 10.

As the fuel pieces 11 reach the end of the conveyor, they drop off of the conveyor and into the inlet portion 51 of entrance chute 50. The fuel pieces 11 accelerate during the vertical drop and are directed between the rollers 45 by the angled outlet portion 52 of the entrance chute 50. The proximity and exposure of the upper resilient roller 45 assists in preventing jamming of the fuel pieces 11. Additionally, the acceleration of the tire pieces assists in preventing jamming of the fuel pieces 11. Any jamming of fuel pieces 11 that may occur in the entrance chute 50 may be cleared by removing the ball lock pin 57 and pivoting open the door 55 about the hinge 56 to gain access to the interior of the entrance chute 50.

As the fuel pieces 11 reach the oppositely rotating rollers 45, they are pulled between the rollers 45 by the exposed outer radial surface of the roller 45 within the entrance chute 50 and forwardly projected. The rollers 45 elastically deform around the fuel pieces 11 as they pass between the rollers 45. Therefore, fuel pieces 11 of a wide variety of sizes can used and mixed. The spacing between the rollers 45 is critical. The rollers 45 should be spaced close enough to project the smallest fuel pieces 11. However, the rollers 45 are preferably not contacting one another in order to minimize the noise output of the fuel projector 10. If course fuel pieces 11 are utilized, it may be required to increase the spacing between the rollers 45. The mechanism 80 for adjusting the spacing between the rollers 45, described above, is utilized to optimally position the rollers 45 and also to account and make-up for wear on the rollers 45.

The fuel pieces 11 are projected by the rollers 45 into the exit chute 60 which directs the fuel pieces into the kiln 12. Any jamming of fuel pieces 11 that may occur in the exit chute 60 may be cleared by pivoting open the door 68 about the hinge 69 to gain access to the interior of the exit chute 50.

The windage of projection of the fuel projector can be adjusted to optimally feed a variety of kiln sizes or designs. It may be required to adjust the windage of projection to avoid interference of the conventional fuel stream 13 coal injection pipes, or other obstructions. The adjustment is made by untightening the bolts 26, 27 fastening the pivoting base 30 to the base frame 20. The turnbuckle 72 is then adjusted to pivot the pivoting base 30 about the pivot pin 71 to the desired windage angle. Once the derived windage angle the bolts 26, 27 are retightened.

Figure 2:
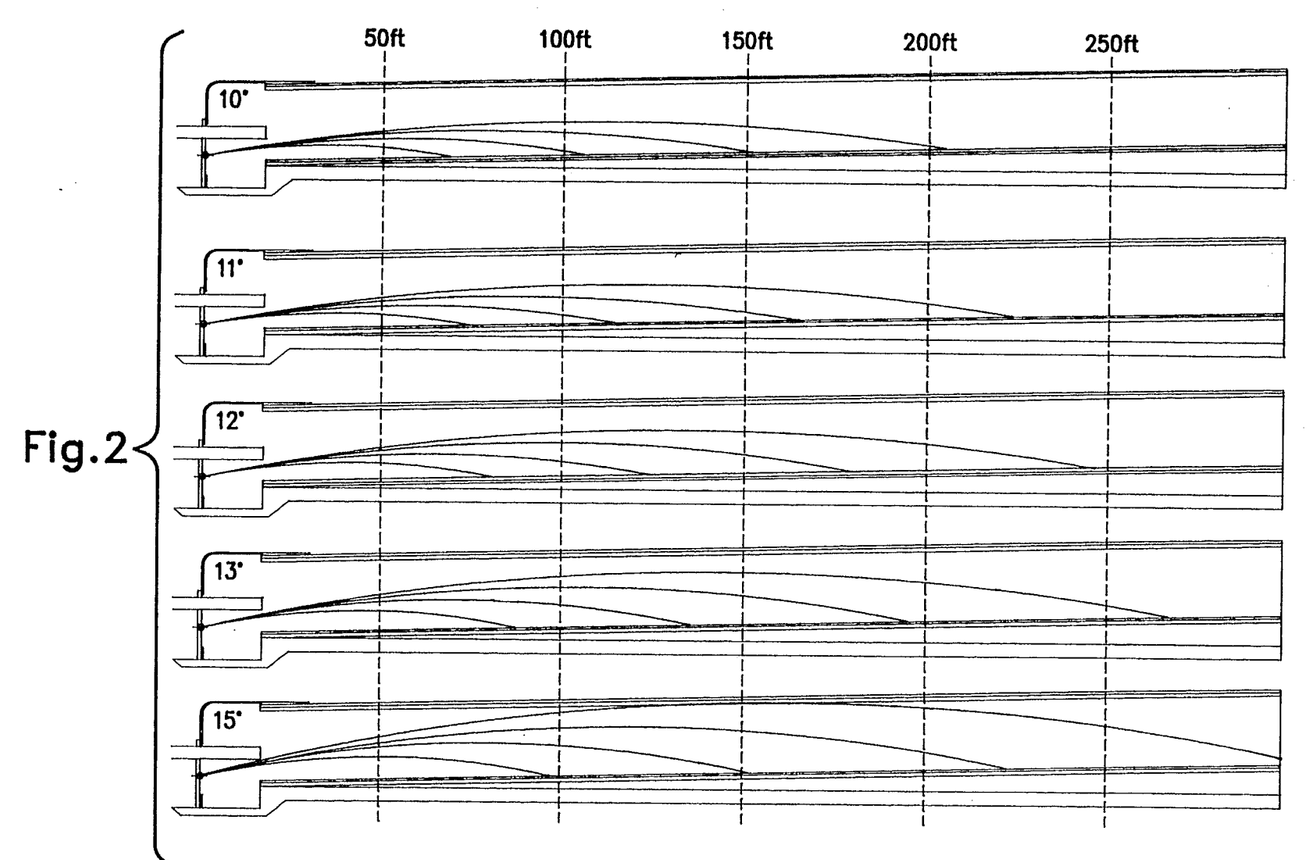
FIG. 2 shows the trajectory of the fuel having varying inclinations and velocities.

Additionally, the velocity of rotation of the resilient rollers 45 and the inclination of projection of the fuel projector can be adjusted to optimally project the fuel pieces 11 a desired distance into the kiln 12. The adjustment to the inclination of projection is made by adjusting the turnbuckle 77 to pivot the support bar 40 about the pivot pin 76 to the desired inclination angle. FIG. 2 shows the distances, in feet, that the fuel pieces 11 are projected into the kiln 12 for inclination angles of 10, 11, 12, 13, and 15 degrees above horizontal with the rollers 45 rotating at velocities of 55, 70, 85, and 100 miles per hour at each inclination angle. The trajectories resulting in distances of over 200 feet provide the fuel pieces 11 with ample time to burn in the kiln and complete all necessary chemical reactions.

Although a particular embodiment of the invention has been described in detail, it will be understood that the invention is not limited correspondingly in scope, but includes all changes and modifications coming within the spirit and terms of the claims appended hereto.

What is claimed is:

1. An apparatus for injecting fuel in the form of pieces of various sizes into a burning zone of a kiln having an end inlet, said apparatus comprising:

two resilient rollers, disposed one above the other, rotating in opposite directions and each having an outer radial surface, said rollers rotating about generally parallel axes spaced such that said outer radial surfaces of said rollers are generally adjacent to project relatively small fuel pieces;

at least one motor for rotating said rollers;

an entrance chute having an inlet portion generally vertical for receiving said fuel pieces and downwardly accelerating said fuel pieces by gravity and an outlet portion generally open adjacent said rollers for directing said fuel pieces generally between said rollers, said outlet portion having a bottom surface downwardly inclined toward an upper side of a bottom one of said rollers;

wherein said rollers have a resiliency effective for elastically deforming around relatively large fuel pieces to project said fuel pieces as said rollers rotate; and an exit chute for directing said projected fuel pieces through said kiln end inlet.

2. The apparatus of claim 1, wherein said outer radial surface of said rollers is a gripping surface.

3. The apparatus of claim 1, wherein said rollers comprise pneumatic rubber tires.

4. The apparatus of claim 3, wherein said motor is adapted for rotating said pneumatic rubber tires mounted on motor vehicle wheels.

5. The apparatus of claim 4, wherein said pneumatic rubber tires are motor vehicle tires.

6. The apparatus of claim 3, wherein said pneumatic rubber tires are mounted on motor vehicle wheels.

7. The apparatus of claim 1, wherein said generally parallel axes of said rollers are substantially horizontal and in a generally inclined plane relative to one another.

8. The apparatus of claim 7, wherein said apparatus comprises a mechanism for adjusting the inclination of said generally inclined plane.

9. The apparatus of claim 1, wherein said outlet portion of said entrance chute is contoured to said rollers.

10. The apparatus of claim 1, wherein said outlet portion of said entrance chute has a width generally less than a width of said outer radial surfaces of said rollers.

11. The apparatus of claim 1, wherein at least a portion of said outlet portion of said entrance chute is movable for clearing jammed fuel pieces.

12. The apparatus of claim 1, wherein said exit chute is contoured to said rollers and has an axis generally perpendicular to a plane containing said generally parallel axes of said rollers.

13. The apparatus of claim 12, wherein at least a portion of said exit chute is movable for clearing jammed fuel pieces.

14. The apparatus of claim 12, wherein at least a portion of said exit chute at an end opposed to an end adjacent said rollers is removable for replacement when damaged.

15. The apparatus of claim 1, wherein said apparatus further comprises a mechanism for adjusting the inclination of said projected fuel.

16. The apparatus of claim 15, wherein said apparatus further comprises a base and a pivotable support, said exit chute being mounted to said pivotable support, and wherein said mechanism for adjusting inclination comprises a turnbuckle mounted between said base and said pivotable support.

17. The apparatus of claim 1, wherein said apparatus further comprises a mechanism for adjusting the windage of said projected fuel.

18. The apparatus of claim 17, wherein said apparatus further comprises a base and a pivotable base, said exit chute being mounted to said pivotable base, and wherein said mechanism for adjusting windage comprises a turnbuckle mounted between said base and said pivotable base.

19. The apparatus of claim 1, wherein said apparatus further comprises a mechanism for adjusting the spacing between said generally parallel axes of said rollers.

20. The apparatus of claim 19, wherein said apparatus further comprises a pivotable motor support and a support, one of said rollers being mounted to said motor support, and wherein said mechanism for adjusting the spacing comprises an adjustment screw between said motor support and said support.

21. The apparatus of claim 1, wherein said bottom surface of said outlet portion is inclined about 50 degrees above a plane of projection of said fuel pieces.

22. An apparatus for injecting fuel in the form of pieces of various sizes into a burning zone of a kiln having an end inlet, said apparatus comprising:

two pneumatic rubber tires rotating in opposite directions and each having an outer radial surface, said tires rotating about generally parallel axes being substantially horizontal and in a generally inclined plane and spaced such that said outer radial surfaces of said tires are generally adjacent to project relatively small fuel pieces;

at least one motor for rotating said tires;

an entrance chute having a generally vertical inlet portion for receiving said fuel pieces and downwardly accelerating said fuel pieces by gravity and an outlet portion generally open adjacent said tires for feeding said fuel pieces between said tires;

said tires elastically deforming around relatively large fuel pieces to project said various size fuel pieces as said tires rotate; and an exit chute having an axis perpendicular to said generally inclined plane of said tire axes for directing said projected fuel pieces through said kiln end inlet.

* * * * *